United States Patent [19]

Keller

[11] Patent Number: 5,680,801

[45] Date of Patent: Oct. 28, 1997

[54] MACHINING DAMPER AND METHOD OF USING SAME

[75] Inventor: Jeffrey S. Keller, Cincinnati, Ohio

[73] Assignee: General Electric Company, Cincinnati, Ohio

[21] Appl. No.: 552,320

[22] Filed: Nov. 2, 1995

[51] Int. Cl.$^6$ .................................................... B23B 1/00
[52] U.S. Cl. .............................. 82/1.11; 82/163; 279/137
[58] Field of Search ........................ 82/163, 1.11; 279/89, 279/157, 137, 125, 127, 133, 141, 151; 74/574

[56] References Cited

U.S. PATENT DOCUMENTS

| | | |
|---|---|---|
| 283,367 | 8/1883 | Barclay . |
| 2,367,709 | 1/1945 | Arkus-Duntov et al. ................. 74/574 |
| 2,496,545 | 2/1950 | Kraemer ............................. 279/133 X |
| 3,691,878 | 9/1972 | Mitchell . |
| 3,710,661 | 1/1973 | Mitchell . |
| 4,178,819 | 12/1979 | Mahon . |
| 4,523,499 | 6/1985 | Aldridge, Jr. . |
| 4,530,507 | 7/1985 | Lee, Jr. . |
| 4,679,802 | 7/1987 | Beal ................................. 279/141 X |
| 4,753,048 | 6/1988 | Asada et al. . |
| 4,848,183 | 7/1989 | Ferguson ............................ 74/574 |
| 4,850,243 | 7/1989 | George .............................. 74/574 |
| 4,875,693 | 10/1989 | Nowak et al. ....................... 279/133 X |
| 4,895,047 | 1/1990 | George .............................. 74/574 |
| 4,961,487 | 10/1990 | Langeneckert . |
| 5,095,786 | 3/1992 | Bellinghausen et al. . |
| 5,180,174 | 1/1993 | Province ............................. 279/133 X |
| 5,291,692 | 3/1994 | Takahashi et al. . |
| 5,297,460 | 3/1994 | Hartman et al. . |
| 5,440,949 | 8/1995 | Leibman . |
| 5,456,146 | 10/1995 | Hubbard et al. ..................... 82/163 X |
| 5,464,233 | 11/1995 | Hanai ................................ 270/137 |

*Primary Examiner*—Daniel W. Howell
*Assistant Examiner*—Henry W. H. Tsai
*Attorney, Agent, or Firm*—Andrew C. Hess; Nathan D. Herkamp

[57] ABSTRACT

A dampening apparatus for dampening vibrations of a workpiece during machining, the dampening apparatus having a dampener, a support to support and place the dampener in abutting vibration absorbing contact with the workpiece, and a dampener fixture for holding the dampener fixed relative to the workpiece. A pressure adjusting apparatus to adjust contact pressure between the dampener and the workpiece is preferably included. The dampener may further include a number of dampening rods supported by the plate at first ends of the rods and which in turn support dampening elements at distal second ends of the rods. The dampening elements may be lugs made of a resilient material such as rubber and the lugs may have flat surfaces for being placed in abutting vibration absorbing contact with the workpiece. The invention also includes a method of machining a thin web of a workpiece having an annular inner hub connected to a concentric annular outer rim by the thin web using the dampener. The preferred method includes adjusting the dampener to deflect the center of the web a predetermined amount before machining.

36 Claims, 3 Drawing Sheets

MACHINING DAMPER AND METHOD OF USING SAME

BACKGROUND OF THE INVENTION

1. Field of the Invention

The present invention relates to machining apparatus that remove machine stock by turning such as lathes and milling machines and, more particularly, to damper apparatus and method for using such an apparatus for damping vibrations known as chatter during associated machining processes.

2. Discussion of the Background Art

Many parts have very thin cross sections that must be machined such as a rotating seal used in large aircraft gas turbine engines which are designed with weight minimization as a primary objective. These are large diameter parts with extremely thin webs which are difficult to machine because of a phenomenon referred to as chatter, which is a high frequency vibration of the part's surface against a cutting tool such as of a lathe or milling machine. When chatter occurs in a machining operation the sound can be deafening, the part surface can be damaged and or its finish become unacceptable. The surface may end up having an unacceptable "washboard" finish and the likelihood of cutting tool failure is greatly increased. Numerous methods to minimize or reduce machining chatter exist, they include design change, cutting tool geometry changes, machining parameter changes, and machine and part set-up changes. All of these have drawbacks which can include high cost, complexity, difficulty of use, and effectiveness. Some of the previous methods for reducing and/or eliminating chatter include applying several pounds of modeling clay to the thin part web opposite the side being machined prior to loading the part and placing inner tubes with flexible valve stem extensions (designed for 18 wheel trucks) inside the fixture to enable the operator to add part support selectively. These seriously compromised web thickness inspection during machining and the tubes were also prone to puncture from machining chips. A vacuum chuck may be used on lathes, which consists of a machine-mounted vacuum pump, connected through a rotating vacuum coupling to a cast iron fixture with a matching web profile and sealing O-rings. The part is first loaded to the fixture, then the vacuum is actuated drawing the part back firmly against the fixture surface. The part can then be machined without concern about web vibration. The part is unfortunately absolutely restrained and any forging stresses will become apparent when the finished part is unloaded and the web pops into a new and undesirable cross-sectional configuration. Given enough experience it is possible to machine to a non-blueprint configuration and have a part "pop" into the desired shape in the free-state but it is difficult. Furthermore should forging manufacturing change such as with a new forging vendor the whole process would have to be repeated. Vacuum chucks with pumps typically cost four to five times more than conventional fixtures, and rarely permit multiple set-ups. These fixtures also do not accommodate part configuration changes easily. Another approach to chatter minimization is to change cutting tool materials and geometry, and/or machining parameters. Both result in productivity and part quality compromises. It is not possible to machine long webs using small nose radius tools in a single pass, consequently it is necessary to change tools and blend in mid-web a number of times. Such tooling also requires greatly reduced machining rates. Therefore, it is highly desirable to have a some way of reducing or eliminating chatter during the machining of these thin section workpieces and that allows free-state machining, i.e. free to move or deflect in front of the cutting tool, of thin webs or other thin sections and that is easy to build and use, has a low cost and, is effective.

SUMMARY OF THE INVENTION

A damping apparatus for dampening vibrations of a workpiece during a machining process, the damping apparatus having a dampener for absorbing vibrations in the workpiece, a support to support and place the dampener in abutting vibration absorbing contact with the workpiece, and a dampener fixture for holding the dampener fixed relative to the workpiece. The preferred embodiment of the invention includes a pressure adjusting apparatus to adjust contact pressure between the dampener. The support may include a plate which supports the dampener and may further include a number of damping rods supported by the plate at first ends of the rods and which in turn support damping elements at distal second ends of the rods. The damping elements may be lugs made of a resilient material such as rubber and the lugs may have flat surfaces for being placed in abutting vibration absorbing contact with the workpiece. In one embodiment the lugs are generally spherical and have the flat surface for being placed in abutting vibration absorbing contact with the workpiece.

Another embodiment of the invention is a fixture assembly for securing a workpiece on a machine, the assembly comprising having a fixture base, annularly disposed concentric inner and outer workpiece supports disposed about a center of the base and extending away from a front face of the base, inner and outer clamping mechanisms suitably situated to clamp the workpiece to the inner and outer workpiece supports respectively, and a damping apparatus for damping vibrations of the workpiece during a machining process. The damping apparatus affixed to the base includes a dampener for absorbing vibrations in the workpiece and a dampener support to support and place the dampener in abutting vibration absorbing contact with the workpiece. The fixture assembly may further include a pressure adjusting apparatus to adjust contact pressure between the dampener and the workpiece as well as other features discussed above.

The invention also includes a method of machining a thin web of a workpiece having an annular inner hub connected to a concentric annular outer rim by the thin web. The method includes a) fixturing the workpiece in a workpiece fixture on the machine such that the inner hub and the concentric outer rim are supported by concentric inner and outer workpiece supports respectively; b) placing a dampener in abutting vibration absorbing contact with the workpiece such that the dampener is supported by a dampener support which is fixed relative to the workpiece and the dampener is suitable for damping vibrations of the workpiece during the machining process; and c) machining a face of the web of the workpiece by effecting relative movement between the web and a cutting tool. The preferred method includes adjusting the dampener in abutting vibration absorbing contact with the workpiece to deflect the center of the web a predetermined amount before machining with the tool. One particular embodiment of the invention provides for the predetermined amount to have an order of magnitude of 0.001 inches.

ADVANTAGES OF THE INVENTION

One advantage of the present invention is that it provides superior selective damping of chatter in a thin section of a workpiece while permitting a relatively "free-state" part set-up and machining. The lack of which is a major disadvantage of other chatter eliminating designs. The invention can be used on machines which rotate the workpiece such as on a chuck of a lathe or on a machine on which the part remains at rest and the tool rotates and is translated such as on a milling machine. The present invention also allows uncompromised and easy web thickness inspection during machining.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
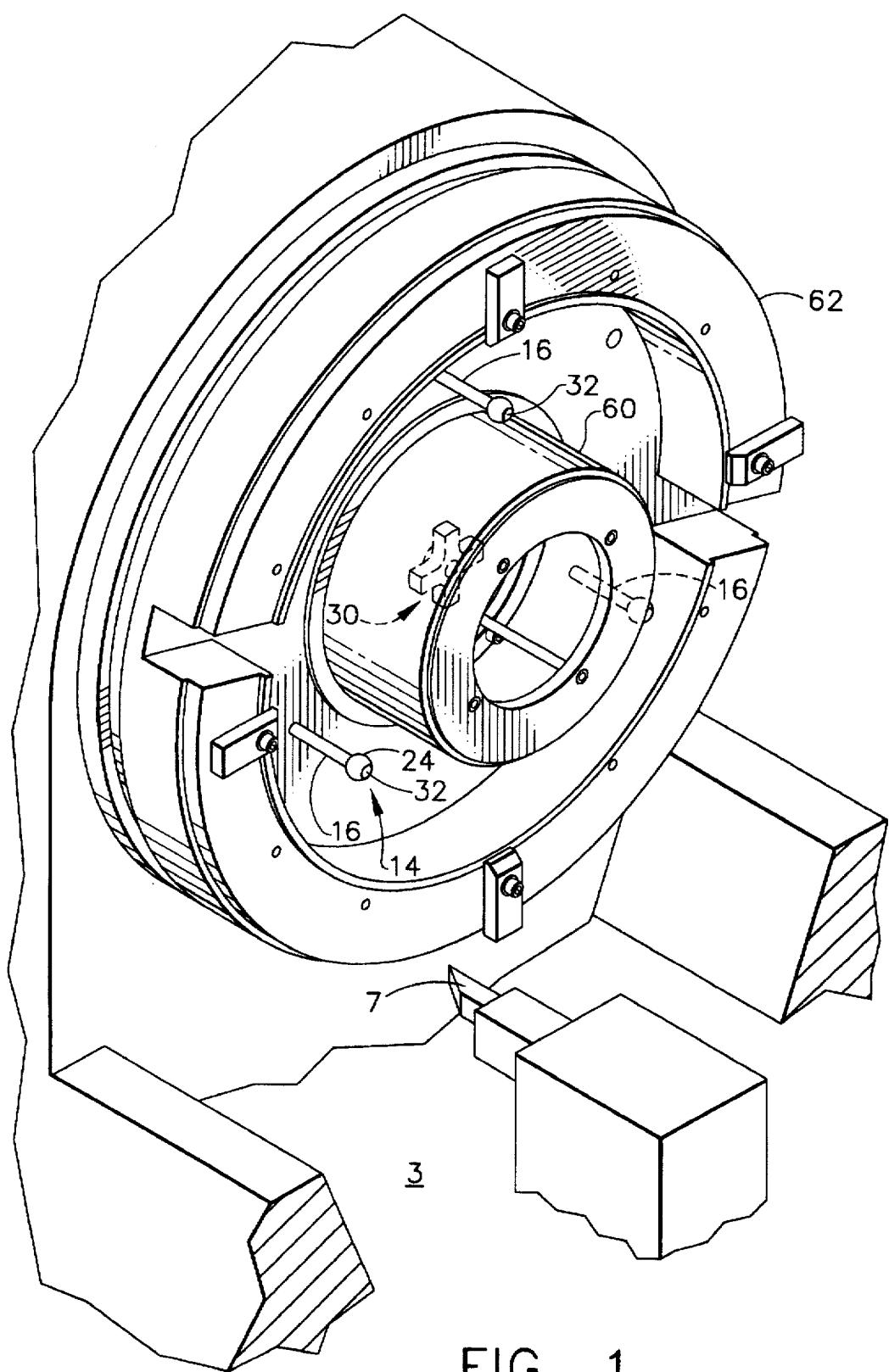
FIG. 1 is a perspective view of an exemplary embodiment of the invention mounted on a lathe.
Figure 2:
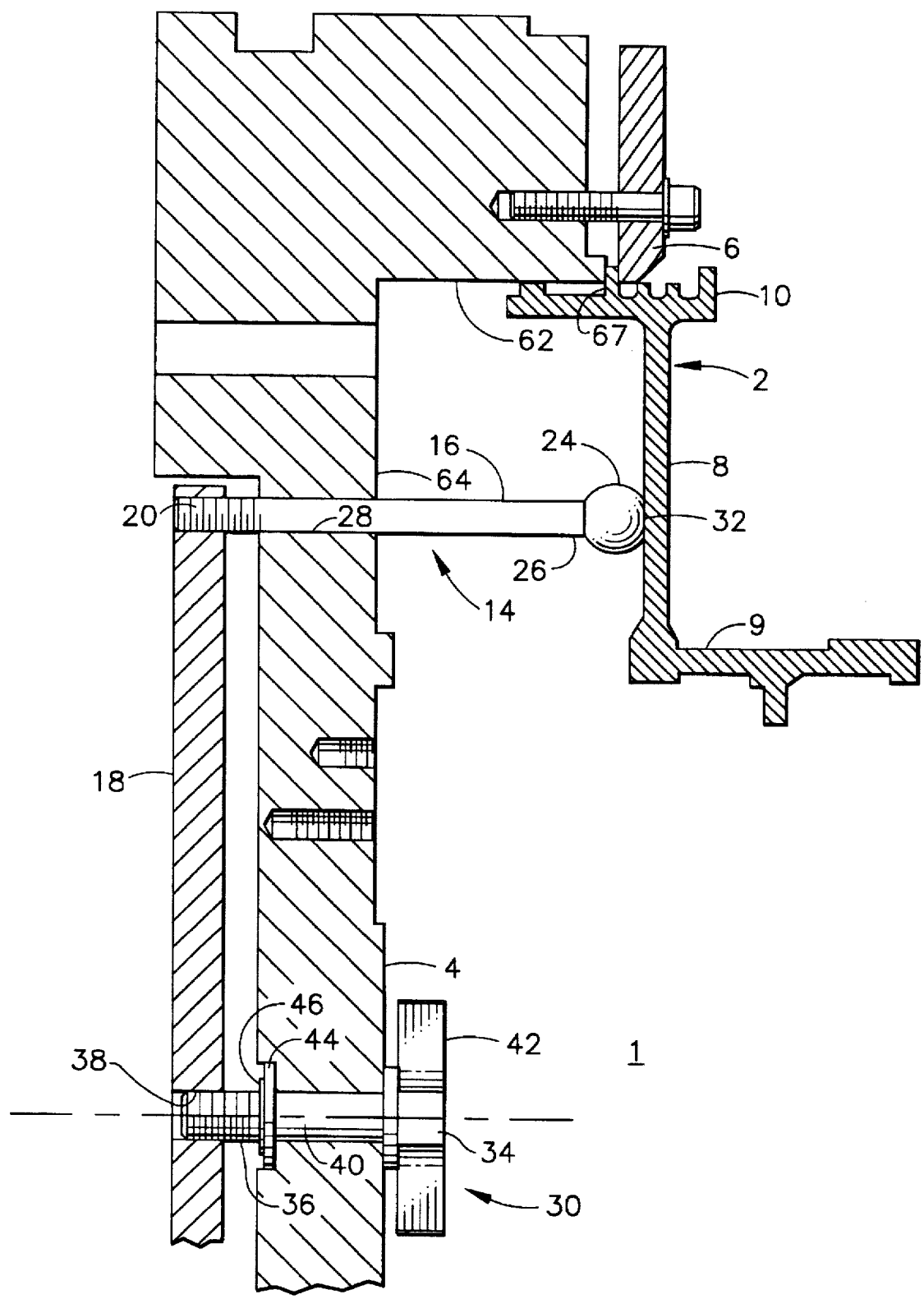
FIG. 2 is a partial cross-sectional view of the exemplary embodiment of the invention illustrated in FIG. 1 to rough machine a gas turbine engine seal which illustrates a workpiece for which the present invention was designed.
Figure 3:
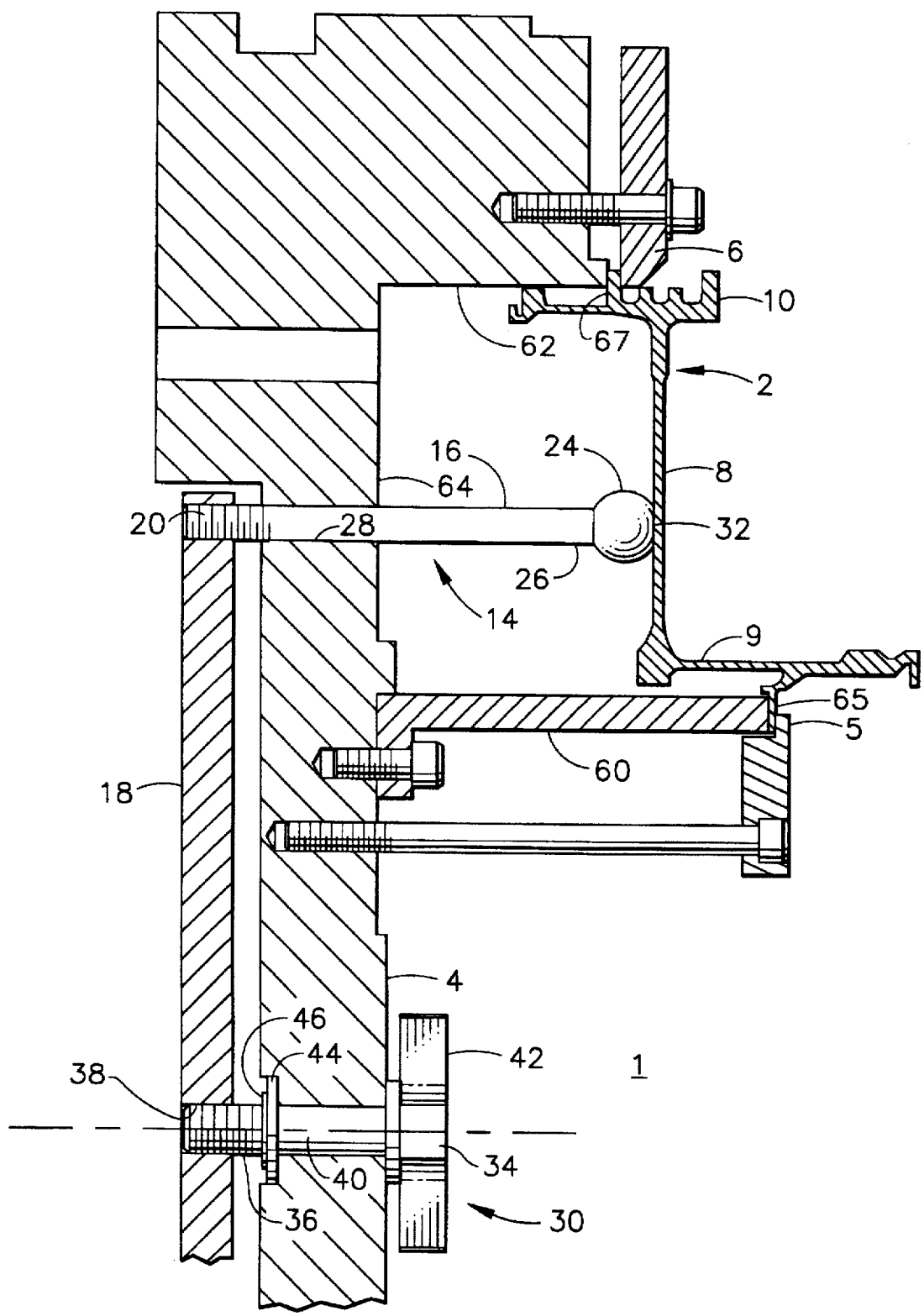
FIG. 3 is a partial cross-sectional view of the exemplary embodiment of the invention to finish machine the workpiece illustrated in FIG. 2.

Referring now to the drawings in detail, wherein identical numerals indicate the same elements throughout the figures, FIG. 1 illustrates an exemplary embodiment of the present invention, a damping apparatus 1 for damping vibrations of a workpiece 2 illustrated in FIG. 2 during a machining process. The invention is illustrated as it might be used on a lathe 3 which has a fixture base 4 upon which the workpiece 2, illustrated in FIG. 2 for rough machining and in FIG. 3 for semi-finish machining, as a gas turbine annular seal. The workpiece 2 is clamped to the fixture base 4 by inner annular clamps 5 for rough machining as illustrated in FIG. 2 and is further clamped to the fixture base by outer annular clamps 6 for semi-finish machining as illustrated in FIG. 3.

The machining process involves turning the workpiece 2 and using a stationary tool 7 of the lathe 3 to remove material from an annular thin web 8 disposed between an annular inner hub 10 and an annular outer rim 9. The inventions dampens any vibrations which the web 8 may experience during the machining process. The damping apparatus 1 and process of machining of the present invention may be used for workpiece or machine stock removal on a machine where the tool is rotated and is translated along two or three axis and the fixture base and workpiece are held fixed such as is done on a milling machine. According to one embodiment the web starts out, as illustrated in FIG. 2, with a first thickness T1 of about 0.210 inches and has about 0.05 inches of material removed from each of a first side S1 and an opposite second side S2 of the web 8, by rough machining methods, to bring the web down to a second thickness T2 of about 0.110 inches. For this procedure the workpiece 2 is clamped to the fixture base 4 by inner annular clamps 5 for rough machining as illustrated in FIG. 2. The outer rim 9 is unrestrained and the web 8 is in a relatively free-state during machining. The workpiece 2 is further clamped to the fixture base 4 by outer annular clamps 6 for semi-finish machining as illustrated in FIG. 3. The semi-finishing procedure additionally removes about 0.035 total inches of material from the web 8, by semi-finish machining methods, to bring the web down to a third thickness T3 of about 0.085 inches.

The damping apparatus 1 includes a dampener 14, illustrated herein in the form of a number (3 in the exemplary embodiment) of damping rods 16 supported on a dampener plate 18 at first ends 20 of the rods and damping elements 24 at distal second ends 26 of the rods. The dampening rods 16 are disposed though apertures 28 in the fixture base 4 which provides a dampener fixturing means for holding the dampener 14 fixed relative to the workpiece 2, and are supported on the dampener plate 18 which lies beneath the fixture base 4. The damping elements 24 are placed in abutting vibration absorbing contact with the thin web 8 of workpiece 2. The preferred embodiment of the invention includes a pressure adjusting apparatus 30 to adjust contact pressure between the dampener 14 and the web 8. The pressure adjusting apparatus 30 includes a carriage bolt 34 that has a threaded lower portion 36 which engages a threaded hole 38. The carriage bolt 34 has a shanked upper portion 40 with a suitable handle 42 attached at its end to allow for turning of the bolt and engagement and adjustment of pressure between the damping elements 24 and the web 8. A washer 44 is positioned on the shanked upper portion 40 by a snap ring 46 so that the when the handle 42 is turned thereby rotating the carriage bolt 34 causing the dampener plate 18 and the damping rods 16 moves towards or away from the fixture base 4. During machining it has been found that applying enough pressure on the web 8 to deflect the center of the web a predetermined amount on the order of magnitude of 0.001 inches before machining with the tool is very beneficial in preventing vibrations and chattering while still allowing the web to be cut in a relatively free state so as to avoid pre-stressing the web. This design enables the lathe or machine operator to apply local pressure to the to the chatter-prone portion of the workpiece, in this case the web 8, as it is being machined and to remove the pressure at all other times. This can be accomplished quickly and reliably. The range of movement available for the dampener plate 18 and attached damping rods 16 enables machining of both sides of the workpiece on the same fixture.

The damping elements 24 may be lugs made of a resilient material such as rubber and the lugs may have flat surfaces 32 for being placed in abutting vibration absorbing contact with the web 8 of the workpiece 2. The damping elements 24 may be more generally described as rubber capped rods. In the illustrated exemplary embodiment the lugs are generally spherical with the flattened surfaces 32 for being placed in abutting vibration absorbing contact with the workpiece.

The fixture base 4 is part of a lathe fixture assembly for securing the workpiece on the machine. This assembly further includes annularly disposed concentric inner and outer workpiece supports 60 and 62, respectively that are disposed about a center C of the fixture base 4 and which extend away from a front face 64 of the fixture base. The inner and outer annular clamps 5 and 6, respectively provide inner and outer clamping mechanisms suitably situated to clamp the workpiece to the inner and outer workpiece supports 60 and 62, respectively. The workpiece 2 is clamped at inner and outer machining rings 65 and 67, respectively.

The present invention also includes a method of machining a thin web of a workpiece having an annular inner hub connected to a concentric annular outer rim by the thin web. The method includes a) fixturing the workpiece in a workpiece fixture on the machine such that the inner hub and the concentric outer rim are supported by concentric inner and outer workpiece supports respectively; placing a dampener in abutting vibration absorbing contact with the workpiece, wherein the dampener is supported by a dampener support which is fixed relative to the workpiece, and the dampener is suitable for damping vibrations of the workpiece during the machining process, and machining a face of the web of the workpiece by effecting relative movement between the web and a cutting tool. An additional the step of adjusting the dampener in abutting vibration absorbing contact with the workpiece to deflect the center of the web a predetermined amount before machining with the tool may also be beneficial. It has also been found beneficial to use a predetermined amount of deflection on the order of magnitude of 0.001 inches.

While the preferred embodiment of our invention has been described fully in order to explain its principles, it is understood that various modifications or alterations may be made to the preferred embodiment without departing from the scope of the invention as set forth in the appended claims.

I claim:

1. A fixture assembly for securing a workpiece having an annular inner hub connected to a concentric annular outer rim by a thin web on a machine, said assembly comprising:
    a fixture base,
    annularly disposed inner workpiece support disposed about a center of said base and extending away from a front face of said base,
    inner clamping mechanisms suitably situated to clamp the workpiece to said inner workpiece support respectively,
    a damping apparatus for damping vibrations of the thin web of the workpiece during a machining process using the machine, said damping apparatus affixed to said base and comprising;
    a dampener for absorbing vibrations in the thin web of the workpiece, and
    a dampener support to support and place said dampener in abutting vibration absorbing contact with the thin web of the workpiece.

2. A fixture assembly as claimed in claim 1 further comprising a pressure adjusting apparatus to adjust contact pressure between said dampener and the workpiece.

3. A fixture assembly as claimed in claim 2 wherein said dampener support includes a plate which supports said dampener.

4. A fixture assembly as claimed in claim 3 wherein said dampener comprises;
    a number of damping rods disposed though apertures in said fixture base,
    said damping rods supported by said plate at first ends of said rods, and
    damping elements support by said rods at distal second ends of said rods.

5. A fixture assembly as claimed in claim 4 wherein said damping elements comprise lugs made of a resilient material.

6. A fixture assembly as claimed in claim 5 wherein said lugs have a flat surface for being placed in abutting vibration absorbing contact with the workpiece.

7. A fixture assembly as claimed in claim 6 wherein said resilient material is rubber.

8. A fixture assembly as claimed in claim 3 wherein said dampener comprises a number of damping rods which are supported by said plate at first ends of said rods and which have rubber caps at said distal second ends of said rods, said rubber caps having flat surfaces for being placed in abutting vibration absorbing contact with the workpiece.

9. A fixture assembly for securing a workpiece having an annular inner hub connected to a concentric annular outer rim by a thin web on a machine, said assembly comprising:
    a fixture base,
    annularly disposed concentric inner and outer workpiece supports disposed about a center of said base and extending away from a front face of said base,
    inner and outer clamping mechanisms suitably situated to clamp the inner hub and outer rim of the workpiece to said inner and outer workpiece supports respectively,
    a damping apparatus for damping vibrations of the thin web of the workpiece during a machining process using the machine, said damping apparatus affixed to said base and comprising;
    a dampener for absorbing vibrations in the thin web of the workpiece, and
    a dampener support to support and place said dampener in abutting vibration absorbing contact with the thin web of the workpiece.

10. A fixture assembly as claimed in claim 9 further comprising a pressure adjusting apparatus to adjust contact pressure between said dampener and the workpiece.

11. A fixture assembly as claimed in claim 10 wherein said dampener support includes a plate which supports said dampener.

12. A fixture assembly as claimed in claim 11 wherein said dampener comprises;
    a number of damping rods disposed though apertures in said fixture base,
    said damping rods supported by said plate at first ends of said rods, and
    damping elements support by said rods at distal second ends of said rods.

13. A fixture assembly as claimed in claim 11 wherein said damping elements comprise lugs made of a resilient material.

14. A fixture assembly as claimed in claim 13 wherein said lugs have a flat surface for being placed in abutting vibration absorbing contact with the workpiece.

15. A fixture assembly as claimed in claim 14 wherein said resilient material is rubber.

16. A fixture assembly as claimed in claim 11 wherein said dampener comprises a number of damping rods which are supported by said plate at first ends of said rods and which have rubber caps at said distal second ends of said rods, said rubber caps having flat surfaces for being placed in abutting vibration absorbing contact with the workpiece.

17. A method of machining a thin web of a workpiece having an annular inner hub connected to a concentric annular outer rim by a thin web, said method comprising the following steps:
    fixturing the workpiece in a workpiece fixture on the machine such that the inner hub is clamped to and supported by an annularly disposed inner workpiece support and the outer rim is unsupported,
    place a dampener in abutting vibration absorbing contact with the thin web of the workpiece, wherein the dampener is supported by a dampener support which is fixed relative to the workpiece, and the dampener is suitable for damping vibrations of the workpiece during the machining process, and
    rough machining a face of the web of the workpiece by effecting relative movement between the web and a cutting tool.

18. A method of machining as claimed in claim 17 further comprising the following subsequent the steps:

fixturing the workpiece in a workpiece fixture on the machine such that the inner hub and the concentric outer rim are supported by concentric inner and outer workpiece supports respectively, place a dampener in abutting vibration absorbing contact with the workpiece, wherein the dampener is supported by a dampener support which is fixed relative to the workpiece, and the dampener is suitable for damping vibrations of the workpiece during the machining process, and machining a face of the web of the workpiece by effecting relative movement between the web and a cutting tool.

19. A method of machining as claimed in claim 18 further comprising the step of adjusting the dampener in abutting vibration absorbing contact with the workpiece to deflect the center of the web a predetermined amount before machining with the tool.

20. A method of machining as claimed in claim 19 wherein the predetermined amount is on the order of magnitude of 0.001 inches.

21. A fixtured assembly of a workpiece on a machine, said assembly comprising:

a workpiece having an annular inner hub connected to a concentric annular outer rim by a thin web, support means for securing said workpiece to a fixture base, said support means including annularly disposed inner workpiece support disposed about a center of said base and extending away from a front face of said base, inner clamping mechanisms suitably situated to clamp said workpiece to said inner workpiece support respectively, a damping apparatus for damping vibrations of said web during a machining process using the machine, said damping apparatus affixed to said base and comprising;

a dampener for absorbing vibrations in said web, and a dampener support supporting and placing said dampener in abutting vibration absorbing contact with said web.

22. A fixtured assembly as claimed in claim 21 further comprising a pressure adjusting apparatus to adjust contact pressure between said dampener and said web.

23. A fixtured assembly as claimed in claim 22 wherein said dampener support includes a plate which supports said dampener.

24. A fixtured assembly as claimed in claim 23 wherein said dampener comprises;

a number of damping rods disposed though apertures in said fixture base, said damping rods supported by said plate at first ends of said rods, and damping elements supported by said rods at distal second ends of said rods.

25. A fixtured assembly as claimed in claim 24 wherein said dampening elements comprise lugs made of a resilient material.

26. A fixtured assembly as claimed in claim 25 wherein said lugs have a flat surface in abutting vibration absorbing contact with said web.

27. A fixtured assembly as claimed in claim 26 wherein said resilient material is rubber.

28. A fixtured assembly as claimed in claim 23 wherein said dampener comprises a number of damping rods which are supported by said plate at first ends of said rods and which have rubber caps at distal second ends of said rods, said rubber caps having flat surfaces in abutting vibration absorbing contact with said web.

29. A fixtured assembly of a workpiece on a machine, said assembly comprising:

a workpiece having an annular inner hub connected to a concentric annular outer rim by a thin web, support means for securing said workpiece to a fixture base, said support means including annularly disposed inner and outer workpiece supports disposed about a center of said base and extending away from a front face of said base, inner clamping mechanisms suitably situated to clamp said hub to said inner workpiece supports, outer clamping mechanisms suitably situated to clamp said rim to said outer workpiece supports, a damping apparatus for damping vibrations of said web during a machining process using the machine, said damping apparatus affixed to said base and comprising;

a dampener for absorbing vibrations in said web, and a dampener support supporting and placing said dampener in abutting vibration absorbing contact with said web.

30. A fixtured assembly as claimed in claim 29 further comprising a pressure adjusting apparatus to adjust contact pressure between said dampener and said web.

31. A fixtured assembly as claimed in claim 30 wherein said dampener support includes a plate which supports said dampener.

32. A fixtured assembly as claimed in claim 31 wherein said dampener comprises;

a number of dampening rods disposed though apertures in said fixture base, said dampening rods supported by said plate at first ends of said rods, and dampening elements support by said rods at distal second ends of said rods.

33. A fixtured assembly as claimed in claim 32 wherein said dampening elements comprise lugs made of a resilient material.

34. A fixtured assembly as claimed in claim 33 wherein said lugs have a flat surface in abutting vibration absorbing contact with said web.

35. A fixtured assembly as claimed in claim 34 wherein said resilient material is rubber.

36. A fixtured assembly as claimed in claim 31 wherein said dampener comprises a number of damping rods which are supported by said plate at first ends of said rods and which have rubber caps at distal second ends of said rods, said rubber caps having flat surfaces in abutting vibration absorbing contact with said web.

\* \* \* \* \*